United States Patent [19]

Hirose et al.

[11] Patent Number: 5,136,715
[45] Date of Patent: Aug. 4, 1992

[54] TERMINAL APPARATUS FOR RESETTING BY REMOTE CONTROL

[75] Inventors: Ryosuke Hirose, Musashino; Nobumasa Ohya; Hiroshi Takizawa, both of Yokohama; Kenji Yamana, Ayase; Seijun Tanikawa, Kawasaki; Takahiro Yamamoto, Tokyo; Atsushi Suzuki, Kawasaki, all of Japan

[73] Assignee: Fujitsu Limited, Kawasaki, Japan

[21] Appl. No.: 357,818

[22] Filed: May 30, 1989

[30] Foreign Application Priority Data

May 27, 1988 [JP] Japan .................. 63-130822

[51] Int. Cl.⁵ .................. G06F 7/00
[52] U.S. Cl. .................. 395/775; 364/DIG. 1; 364/260.8; 364/280.3
[58] Field of Search .................. 364/200 MS File

[56] References Cited

U.S. PATENT DOCUMENTS

| 4,514,846 | 4/1985 | Federico et al. | 364/200 |
| 4,635,258 | 1/1987 | Salowe | 364/200 |
| 4,648,031 | 3/1987 | Jenner | 364/200 |
| 4,803,682 | 2/1989 | Hara et al. | 364/200 |
| 4,847,749 | 7/1989 | Collins et al. | 364/200 |

FOREIGN PATENT DOCUMENTS 0036172 9/1981 European Pat. Off. .

OTHER PUBLICATIONS

Patent Abstracts of Japan, vol. 9, No. 118 (E-316)[1841], May 23, 1985; & JP-A-60 7247 (Nippon Denki K.K.) Jan. 16, 1985.

*Primary Examiner*—Thomas M. Heckler
*Attorney, Agent, or Firm*—Staas & Halsey

[57] ABSTRACT

A terminal apparatus having a data processing circuit wherein a reset command, which is sent from another station through the same transmission line and according to the same procedure as normal data sent from the station, is detected, and then the data processing circuit is reset in accordance with the reset command. Further, a data renewing command, which is also sent from another station through the same transmission line and according to the same procedure as normal data sent from the station, is detected, and then a content of a data storage in the terminal apparatus is renewed in accordance with the data renewal command.

10 Claims, 7 Drawing Sheets

TERMINAL APPARATUS FOR RESETTING BY REMOTE CONTROL

BACKGROUND OF THE INVENTION (1) Field of the Invention

The present invention relates to a terminal apparatus used in a terminal station in a data communication system.

The terminal apparatus according to the present invention is, in particular, applicable in an unmanned terminal station.

(2) Description of the Related Art

Unmanned stations, wherein data is collected and the collected data is sent to another station, are used, for example, in the following system:

in a fire information network system for detecting and reporting an occurrence of a fire;

in a fuel gas supplying system for monitoring a gas flow rate at a plurality of flow rate monitoring points;

in an electric power supplying system for monitoring an operation at a dam, an electric transformer substation, or the like.

In unmanned stations in the above systems, data is collected in each terminal station, and then is sent to a center or master station.

FIGS. 1A and 1B each show a system wherein data is collected at each terminal station, and then is sent to a master station.

In FIG. 1A, reference numeral 11 denotes a master station, 12-1 to 12-n each denote a terminal station, and 13 denotes a transmission line.

In FIG. 1B, reference numeral 21 denotes a master station, 22 denotes a terminal station, and 23 denotes a transmission line.

In both arrangements of FIGS. 1A and 1B, each terminal station collects data, and sometimes processes the collected data.

On the other hand, the master station sends a command requesting data to the corresponding terminal station(s) through the transmission line.

Responding to the command, the terminal station sends the collected and processed data to the master station through the transmission line. Thus, the master station can monitor the data collected at all of the terminal stations in the system.

The aforementioned fire information network system or the system for monitoring a gas flow rate correspond to the arrangement shown in FIG. 1A, and the aforementioned electric power supplying system wherein operations at a remote place are monitored at a master station, corresponds to the arrangement shown in FIG. 1B.

In the above-mentioned systems, if a malfunction has occurred in an unmanned terminal station, an operator must be sent to the terminal station to reset an terminal apparatus in the station. In particular, when the station is far from the master station, it takes a long time to reset and restart the terminal apparatus in the station, and therefore, the monitoring and the controlling of the system is impossible until the terminal apparatus is reset by an operator.

To solve the above problem, in the prior art, another transmission system is provided between the master station and each terminal station.

FIG. 2 shows a conventional arrangement for resetting and restarting a terminal station by a master station.

In FIG. 2, reference numeral 31 denotes an apparatus of a master station, 32 denotes a terminal station, 33 denotes a data transmission line, 34 denotes a control station attached to the master station, 35 denotes a control station attached with the terminal station, and 36 denotes a control line.

In the arrangement of FIG. 2, a construction consisting of the apparatus of a master station 31, the terminal station 32, and the data transmission line 33, corresponds to the arrangement consisting of the master station 11, the transmission line 13, and each of the terminal stations 12-i (i=1 to n) in FIG. 1A, or corresponds to the arrangement consisting of the master station 21, the transmission line 23, and the terminal station 22 in FIG. 1B.

When the master station 31 detects a malfunction of the terminal station 32 through the data received from the terminal station, the master station 31 sends a reset command to the control station 34 attached to the master station 31. When the control station 34 receives the reset command from the master station 31, the control station 34 sends the reset signal to the control station 35 attached to the terminal station 32, through the control line 36. When the control station 35 receives the reset signal, the control station 35 resets the terminal station 32. Thus, the terminal station wherein a malfunction has occurred can be reset without sending an operator to the terminal station.

However, in the above arrangement, the control stations are provided only for controlling the reset operation at the terminal station, and these control stations are connected by a control line for transmitting a reset signal, therefore, a cost for constructing a system is greatly increased.

Further, generally, it is difficult to equip another line between a master station and a terminal station other than the existing transmission line, and consequently, in the above systems, a stand-by operator is necessary for an emergency case.

In addition, in some systems, renewing or replacing of a program or data stored in an unmanned terminal station, is necessary.

For example, in a fuel gas supplying system, a sensitivity of detection of a gas flow rate must be changed since an amount of fuel gas consumption varies with the season.

Therefore, in the conventional system (for example, fuel gas supplying system), renewing or replacing data or program in a terminal station is carried out manually by an operator.

SUMMARY OF THE INVENTION

An object of the present invention is to provide a terminal apparatus which can be reset and restarted by remote control from the master station using an existing facility.

Another object of the present invention is to provide a terminal apparatus which can be reset and restarted under remote control from a master station using an existing facility, further, data or a program stored in the terminal apparatus can be replaced with new data or a new program by remote control from the master station using an existing facility.

According to the first aspect of the present invention, there is provided a terminal apparatus, comprising: a receiving means for receiving transferred information; a detecting means for detecting predetermined information in the transferred information; a data transferring means for transferring data included in the transferred information to a data processing circuit when the above predetermined information is not detected; and a reset means for resetting the data processing circuit when the above predetermined information is detected.

According to the second aspect of the present invention, there is provided a terminal apparatus, comprising: a data storage means for storing data; a data processing means for processing data using data stored in the data storage means; a receiving means for receiving transferred information; a first detecting means for detecting a reset command in the transferred information; a reset means for resetting the data processing means when the reset command is detected; a second detecting means for detecting a renewal command requesting renewal of data stored in the data storage means, in the transferred information; and a data renewing means for renewing data stored in the data storage means when the renewal command is detected; and a data transferring means for transferring data included in the transferred information to the processing means when neither the reset command nor the renewal command is detected.

DESCRIPTION OF THE PREFERRED EMBODIMENTS

Before describing the preferred embodiment of the present invention, first, the basic principle of the first and second aspects of the present invention is explained below.

Figure 1A:
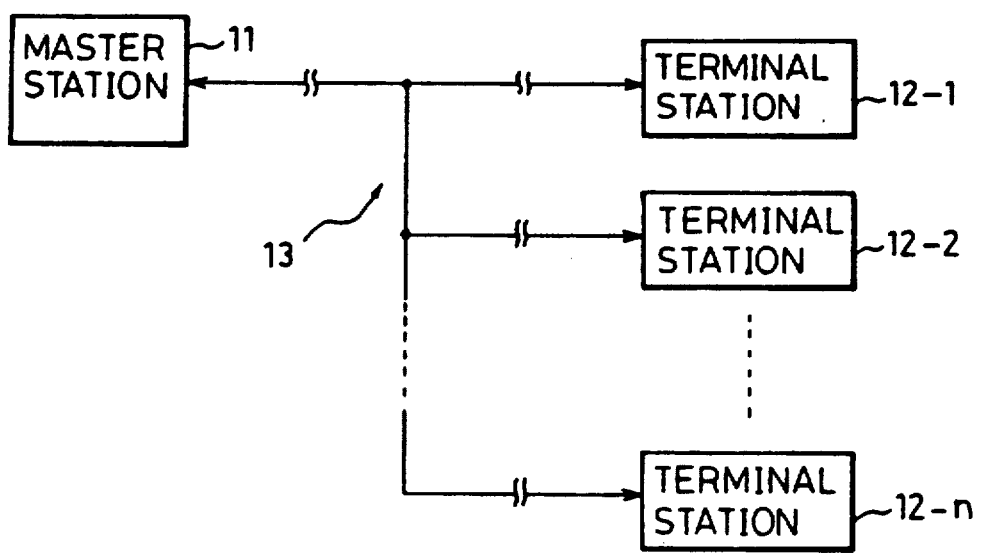
FIGS. 1A and 1B each show a system wherein data is collected at each terminal station, and then is sent to a master station.
Figure 1B:
Figure 2:
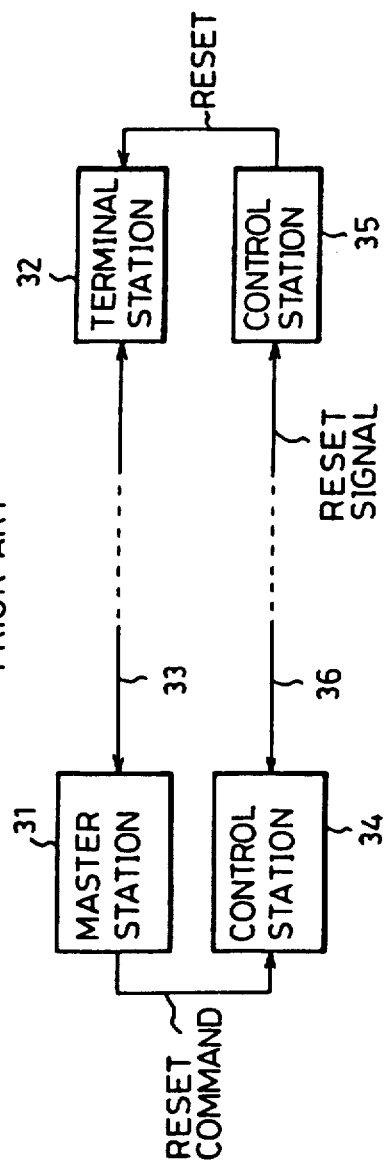
FIG. 2 shows a conventional arrangement for resetting and restarting a terminal station by remote control from a master station.
Figure 3:
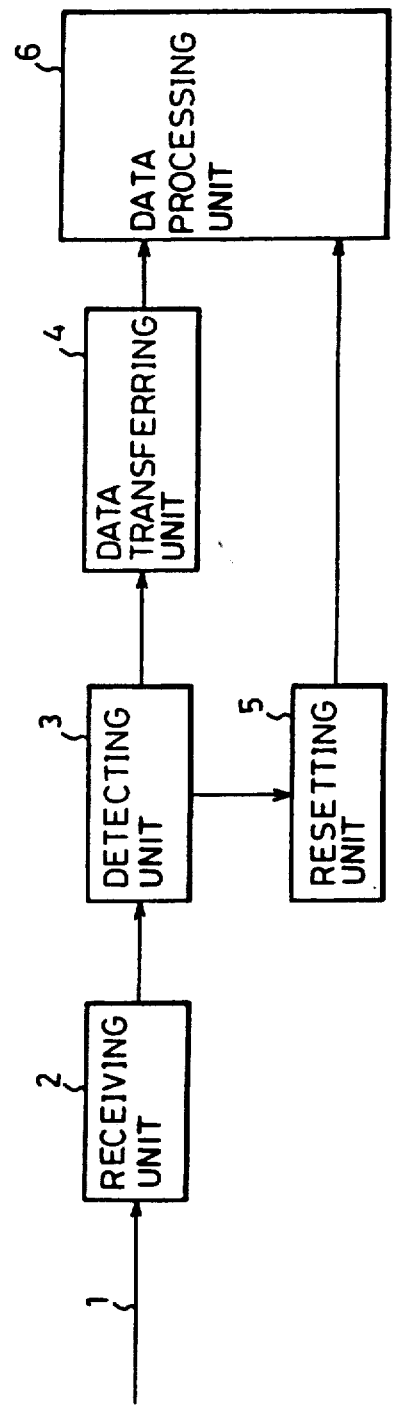
FIG. 3 shows the basic construction of the first aspect of the present invention.

FIG. 3 shows the basic construction of the first aspect of the present invention.

In FIG. 3, reference numeral 1 denotes a transmission line, 2 denotes a receiving unit, 3 denotes a detecting unit, 4 denotes a data transferring unit, 5 denotes a resetting unit, and 6 denotes a data processing unit.

The transmission line 1 is an existing transmission line used for an ordinary data transmission between the terminal apparatus and a master station (not shown).

The data processing unit is an existing construction of the terminal apparatus, and realizes an intrinsic function of the terminal apparatus, i.e., controls the functions of collecting data, processing data, and sending data to a master station.

The receiving unit 2 receives information transferred from another station through the transmission line 1.

The detecting unit 3 detects a predetermined information in the transferred information.

The data transferring unit 4 transfers data included in the transferred information to the data processing unit 6 when the predetermined information is not detected.

The reset unit 5 resets the data processing unit 6 when the above predetermined information is detected.

According to the first aspect of the present invention, when the master station finds a malfunction by checking data transferred from the terminal apparatus (station), the master station sends data which includes the above predetermined information (a reset command), to the terminal station through the transmission line 1.

Then, the terminal apparatus receives the data transferred from the master station at the receiving unit 2, and then a determination whether or not the predetermined information (a reset command) is included in the received data, is made at the detecting unit 3.

If it is determined that the predetermined information (a reset command) is included in the data, the data processing unit 6 is reset by the resetting unit 5.

Or if it is determined that the predetermined information (a reset command) is not included in the data, the received data is simply transferred to the data processing unit 6 through the data transferring unit 4, and therefore, the data processing unit 6 continues to operate in a normal mode.

Namely, the terminal apparatus of FIG. 3 can be reset under the remote control of the master station through the transmission line 1.

In particular, the functions of the receiving unit 2 and the data transferring unit 4 are realized by functions that an existing transmit/receive circuit has, and the transmit/receive circuit is realized by using a communication control processor. The other functions of the detecting unit 3 and resetting unit 5, which correspond to the characteristic features of the present invention, can be realized by only adding program routines for the communication control processor, as described later.

Figure 4:
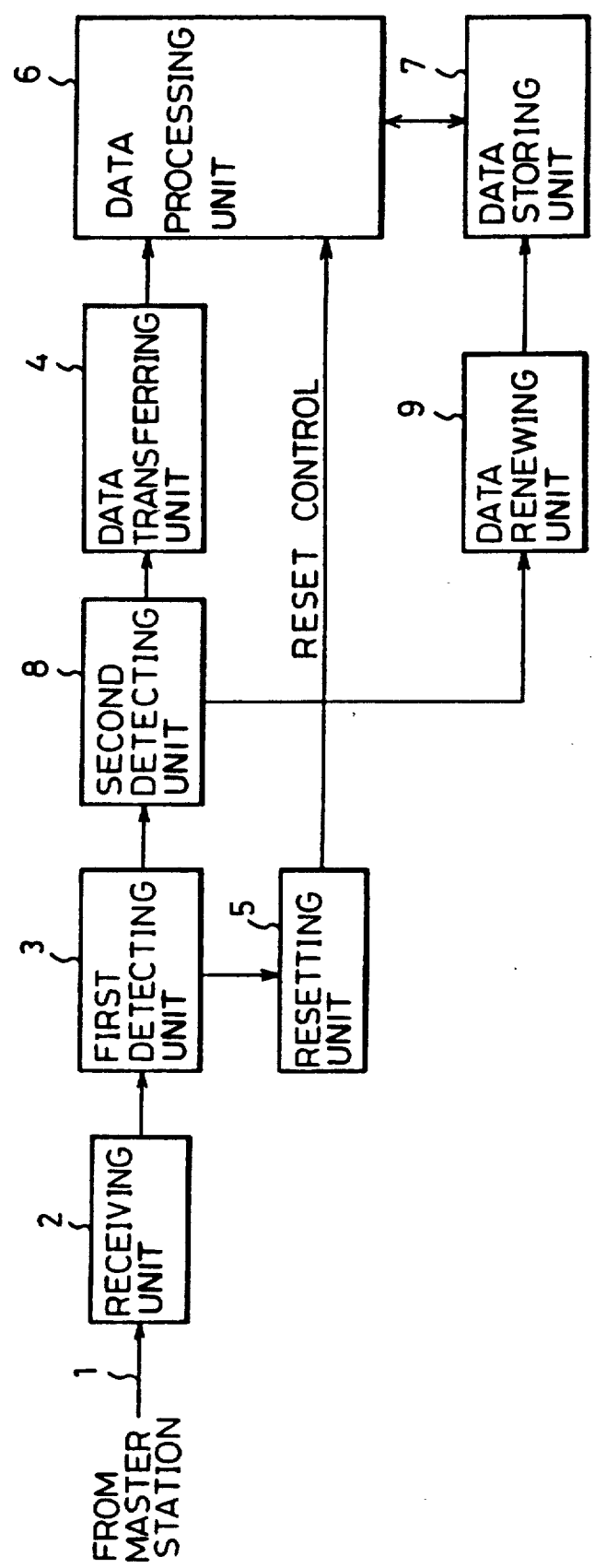
FIG. 4 shows the basic construction of the second aspect of the present invention.

FIG. 4 shows the basic construction of the second aspect of the present invention.

In FIG. 4, the same reference numerals as FIG. 3 each denote the same components in FIG. 3, except that the detecting unit 3 in FIG. 3 for detecting a reset command in received information, is referred to as a first detecting unit.

In addition, in FIG. 4, reference numeral 7 denotes a data storage unit 8 denotes a second detecting unit, and 9 denotes a data renewing unit.

The data storage unit 7 stores data for data processing operation of the data processing unit 6.

The second detecting unit 8 detects a renewal command requesting renewing of data stored in the data storage unit 7, in the information received from the master station.

The data renewing unit 9 renews data stored in the data storage unit 7 in accordance with the renewal command.

According to the second aspect of the present invention, when a change of data stored in the data storage unit 7 in the terminal apparatus is necessary, the master station sends data which includes the renewal command requesting renewing of data stored in the data storage unit 7, to the terminal station through the transmission line 1.

Then, the terminal apparatus receives the data transferred from the master station at the receiving unit 2.

Similar to the aforementioned first aspect, first, a determination whether or not a reset command is included in the received data, is made at the first detecting unit 3.

If it is determined that a reset command is included in the received data, the data processing unit 6 is reset by the resetting unit 5.

Or if it is determined that a reset command is not included in the received data, next, another determination whether or not a renewal command requesting renewal of data stored in the data storage unit 7, is included in the received data, is made at the second detecting unit 8.

If it is determined that the renewal command is included in the received data, the data renewing unit 9 renews the data stored in the data storage unit 7.

Or if it is determined that the renewal command is not included in the received data, the received data is simply transferred to the data processing unit 6 by the data transferring unit 4, and therefore, the data processing unit 6 continues to operate in a normal mode.

The functions of the second detecting unit 8 and the data renewing unit 9, which correspond to the characteristic features of the second aspect of the present invention, can be also realized by only adding program routines of the communication control processor, as described later.

Figure 5:
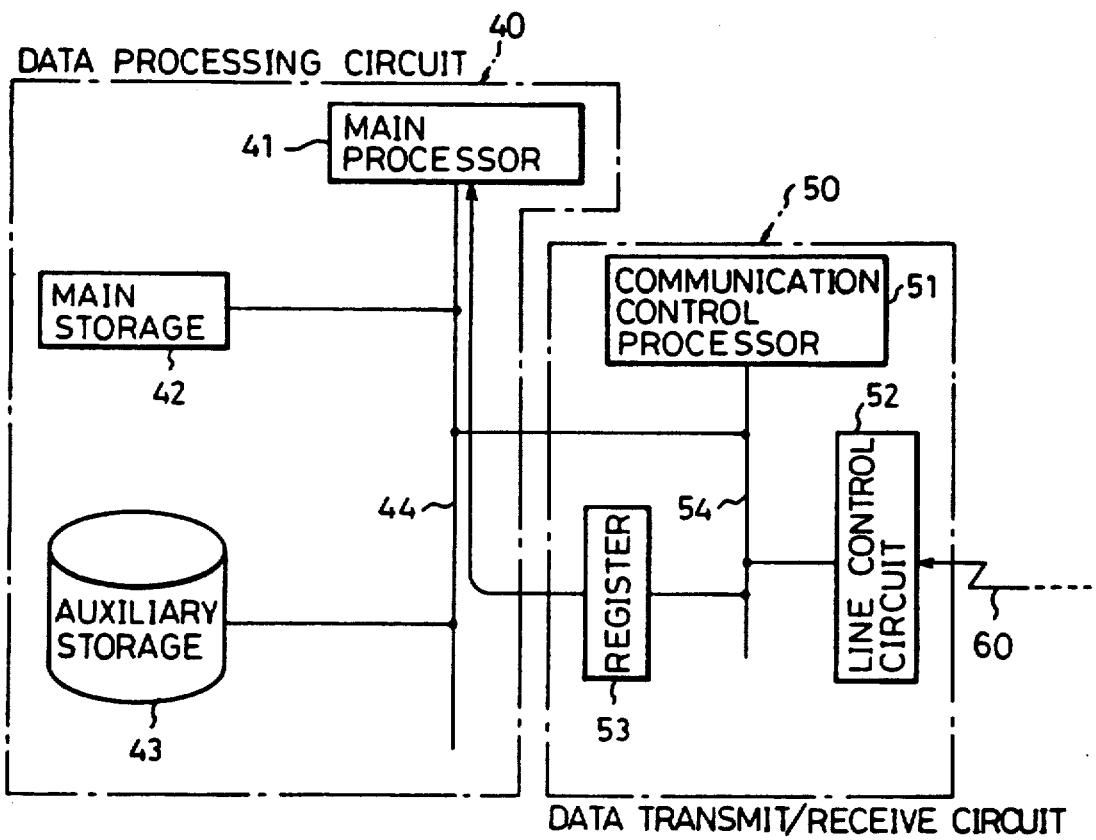
FIG. 5 shows the construction of an embodiment of the present invention.

FIG. 5 shows the construction of a terminal apparatus as an embodiment of the present invention.

In FIG. 5, reference numeral 40 denotes a data processing circuit, 41 denotes a main processor, 42 denotes a main storage, 43 denotes an auxiliary storage, 44 denotes a bus, 50 denotes a data transmit/receive circuit, 51 denotes communication control processor, 52 denotes a line control circuit, 53 denotes a register for resetting the main processor 41, 54 denotes a bus, and 60 denotes a transmission line.

The data processing circuit 40 includes the main processor 41, the main storage 42, auxiliary storage 43, and the bus 44. The main processor 41, and the data transmit/receive circuit 50 includes the communication control processor 51, the line control circuit 52, the register 53, and bus 54.

The main processor 41 controls the original data processing functions of the terminal apparatus, including collecting, processing, and sending out data.

The main storage 42 and the auxiliary storage 43 are connected to the main processor 41 through the bus 44.

The auxiliary storage 43 stores programs and tables of parameters used in operations of the main processor 41. The programs in the auxiliary storage 43 is read out, and then are loaded in the main storage 42, and the main processor 41 carries out the above-mentioned control operations according to the loaded programs.

The data transferred through the transmission line 60 from the master station is received at the line control circuit 52, and then is transferred through the bus 54 to the communication control processor 51.

The communication control processor 51 monitors the received data, and determines whether or not the received data includes a reset command which commands resetting of the main processor 41, and a renewal command requesting renewal of the content of the auxiliary storage 43.

When the communication control processor 51 detects the reset command in the received data, the communication control processor 51 sets a predetermined data in the register 53. The output of the register 53 is applied to the main processor 41, and thereby the main processor 41 is reset.

When the communication control processor 51 detects the renewal command, the communication control processor 51 controls an operation of renewing the content in a predetermined area of the auxiliary storage 43, through the buses 44 and 54.

There are two ways to renew the content of the auxiliary storage 43 in FIG. 5: in one way, (a part of) the content of the auxiliary storage 43 is renewed with data which is newly transferred from the master station; and in the other way, the content of the auxiliary storage 43 is renewed with data which is held in advance in the terminal apparatus.

In the former way, the data with which (a part of) the old content of the auxiliary storage 43 is renewed, must be transferred from the master station. As explained later, in this embodiment, the replacement data for renewal can be transferred together with the above command. Therefore, the communication control processor 51 writes the transferred data in the predetermined area of the auxiliary storage 43 when the above renewal command is detected.

In the latter way, the renewal means restructuring of data in a predetermined area of the auxiliary storage 43 using data which was held in advance in the terminal apparatus of FIG. 5, for example, in another area of the auxiliary storage 43 other than the area wherein the data renewal is requested.

Since the communication control processor 51 directly controls the renewing operation of the auxiliary storage 43 in both the above ways, the renewal is carried out even when a malfunction has occurred in the main processor 41.

As understood from the above explanation of the terminal apparatus of FIG. 5, the main storage 42 in the data processing circuit 40 corresponds to the aforementioned data processing unit 6 in FIGS. 3 and 4, and the auxiliary storage 43 corresponds to the data storage unit in FIG. 4.

The communication control processor 51 and the line control circuit 52 in the data transmit/receive circuit 50 realize the receiving means 2, the detecting unit 3 and the data transferring unit 4 in FIG. 3, and the communication control processor 51 and the register 53 realize the resetting unit 5 in FIG. 3. The second detecting unit 8 and the data renewing unit 9 in FIG. 3, are also realized by the communication control processor 51.

Figure 6:
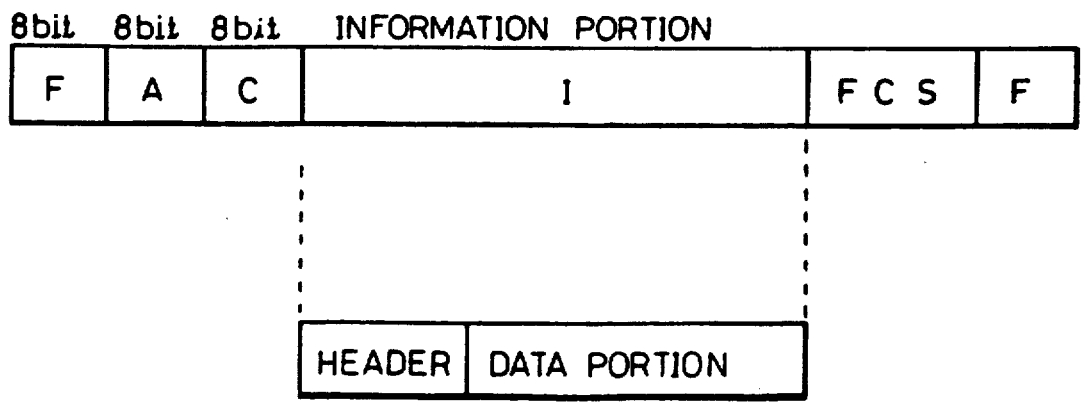
FIG. 6 shows an example of the data format used in the embodiment of the present invention.

An example of the format of data transferred between the master station and the terminal apparatus of FIG. 5 is shown in FIG. 6.

The data format shown in FIG. 6 is in accordance with the well-known format of the high level data link control (HDLC) procedure.

In the format of FIG. 6, "F" denotes a flag sequence portion, "A" denotes an address portion, "C" denotes a control portion, "I" denotes an information portion, and "FCS" denotes a frame check sequence portion.

Among the above portions, the control portion "C" indicates a type of the frame data. When the control portion "C" indicates that the following information portion includes information other than the control commands and responses defined in the HDLC procedure, the content of the information portion "I" can be arbitrarily defined for a user within the HDLC procedure.

Therefore, in this embodiment, the content of the information portion "I" is defined as a form of a packet consisting of two portions, a header portion and a data portion. Thus, a packet communication is carried out between the master station and the terminal station(s) in accordance with the HDLC procedure.

Thus, the aforementioned reset command, and the renewal command can be defined in the header portion or data portion of FIG. 5, and the aforementioned replacement data for renewal operation can be transferred in the data portion of the information portion "I" of the frame shown in FIG. 6.

Next, the control operations which are carried out by the above communication control processor 51 and the main processor 41, are explained with reference to FIGS. 7, 8, and 9.

Figure 7:
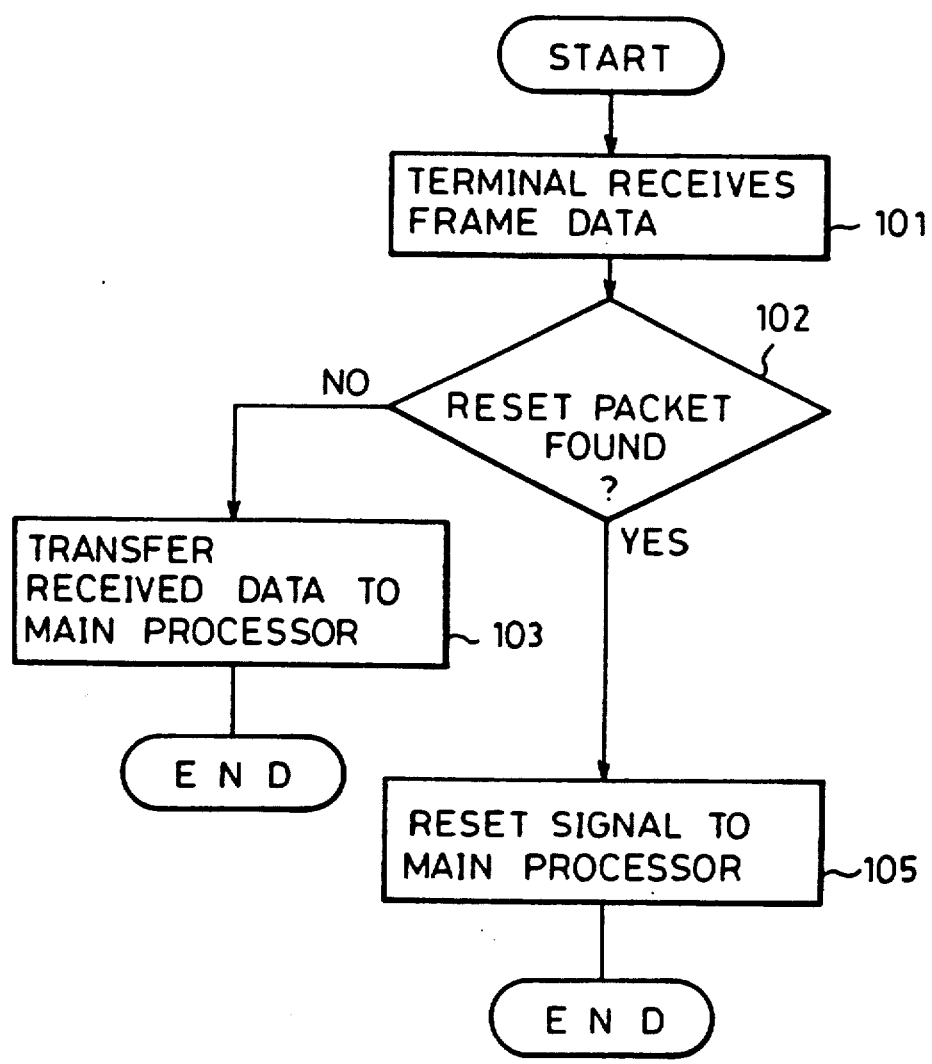
FIG. 7 shows an example of the operation of the communication control processor according to the first aspect of the present invention when the terminal station receives frame data.

FIG. 7 shows an example of the operation of the communication control processor 51 according to the first aspect of the present invention when the terminal station receives frame data.

In FIG. 7, in the step 101, the terminal apparatus receives frame data which has been transferred through the transmission line 60 from the master station, for example, having a format shown in FIG. 6.

In the step 102, it is determined whether or not a reset packet is received, i.e., whether or not the received packet data as shown in FIG. 6, includes a reset command.

If it is determined that a reset packet is not received, the communication control processor 51 transfers the received data to the main processor 41 in the step 103.

If it is determined that a reset command is included in the received packet data in the step 102, the communication control processor 51 sets the predetermined data in the register 53, and thus the output of the register 53 is applied to the main processor 41 to reset the main processor 41 in the step 105.

Figure 8:
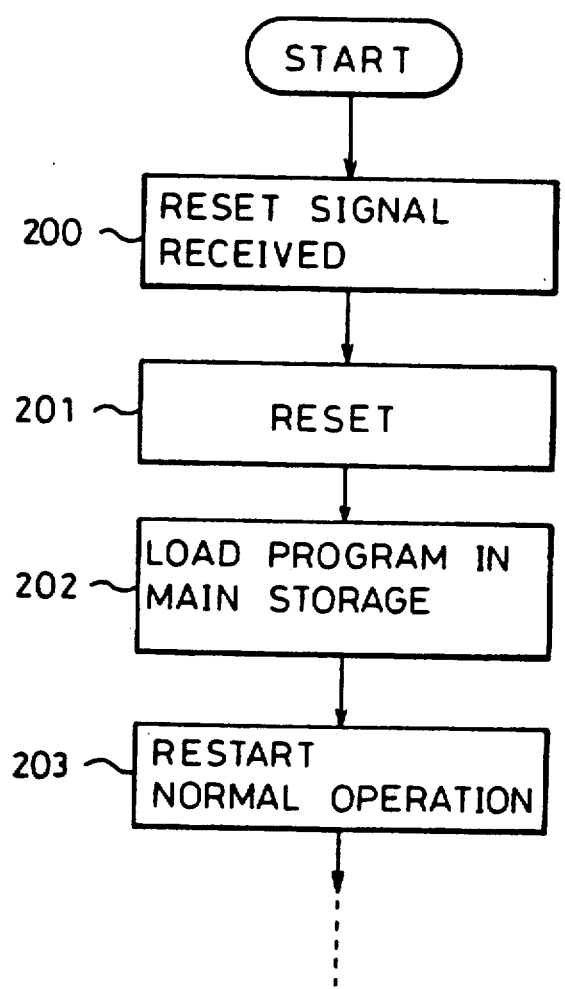
FIG. 8 shows an example of the operation of the main processor when the main processor receives a reset signal.

FIG. 8 shows an example of the operation of the main processor 41 when the main processor 41 receives a reset signal.

In FIG. 8, in the step 200, the main processor 41 receives the output of the register 53, and is immediately reset in the step 201. This reset is a hardware reset, i.e., the resetting operation is carried out by applying a reset signal from the register 53 to a reset terminal of the main processor 41. Then, the main processor 41 carries out an operation of initial program loading, i.e., in the step 202, a predetermined program stored in the auxiliary storage 43 is read out and is loaded in the main storage 42, and then the operation in accordance with the program is started by the main processor 41.

Thus, when a malfunction occurs in the data processing circuit 40 in a terminal apparatus as shown in FIG. 5, for example, when a part of data in the main storage 42 is damaged due to an accidental noise or the like, and then the occurrence of the malfunction is found at a master station by checking the data which has been transferred from the terminal apparatus to the master station, if the master station sends data including a reset command to the terminal apparatus, the reset command is detected at the terminal apparatus, and then, the terminal apparatus is reset and restarts itself.

Figure 9:
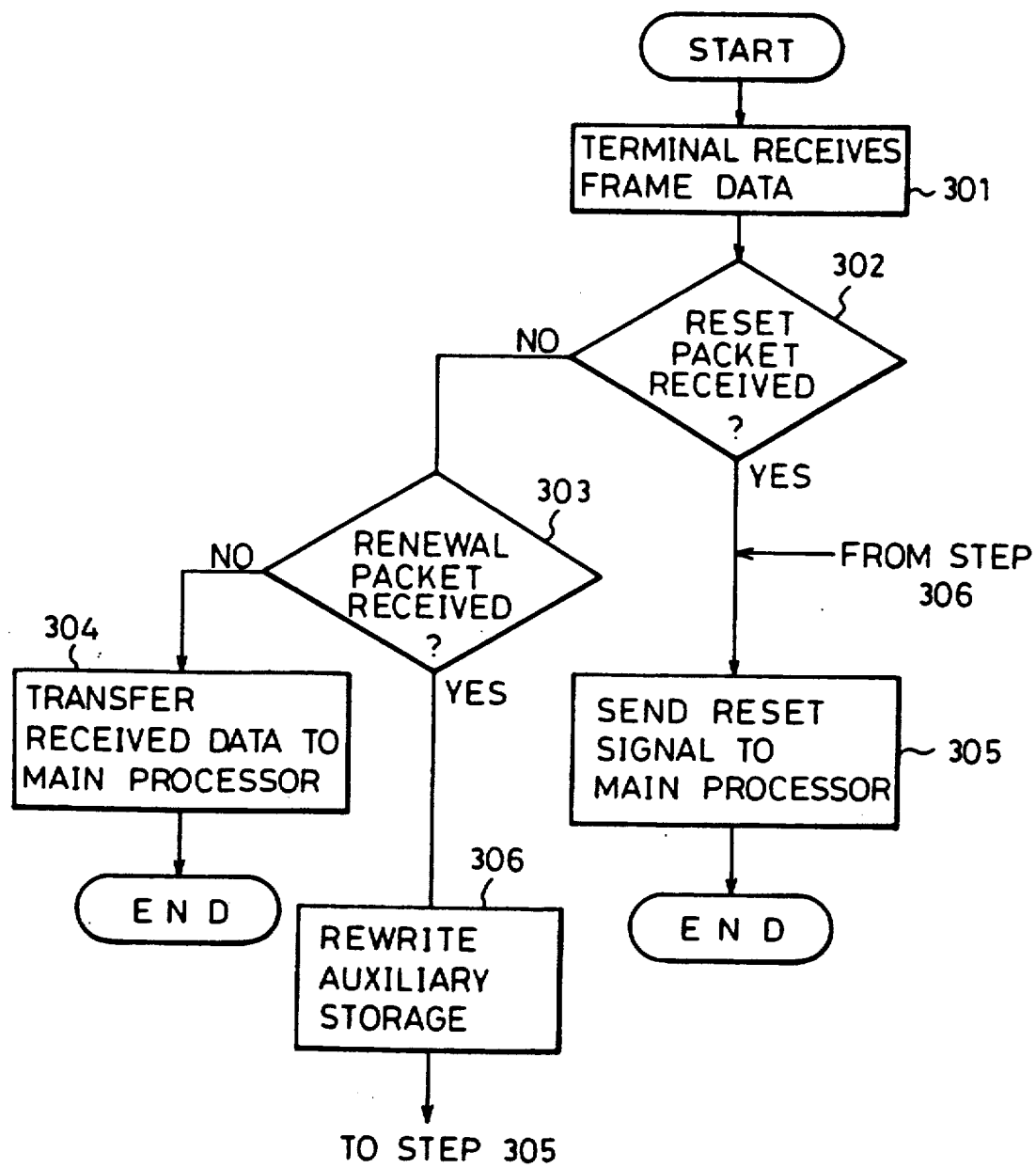
FIG. 9 shows an example of the operation of the communication control processor according to the second aspect of the present invention when the terminal station receives frame data.

FIG. 9 shows an example of the operation of the communication control processor 51 according to the second aspect of the present invention when the terminal station receives a frame data.

The operations in the steps 301, 302 and 305 in FIG. 9 are each equal to the operations in the steps 101, 102 and 105 in FIG. 7, respectively.

In FIG. 9, if it is determined that the reset packet is not included in the received packet data in the step 302, next, in the step 303, it is determined whether or not a renewal packet is received, i.e., whether or not a renewal command requesting renewal of data stored in the auxiliary storage 43, is included in the received packet data.

If it is determined that a renewal packet is not received in the step 303, the communication control processor 51 transfers the received data to the main processor 41 in the step 304. In this case, the main processor 41 receives the transferred data, and then carries out a data processing operation using the transferred data in accordance with an existing program.

If it is determined that a renewal command is included in the received packet data in the step 303, the communication control processor 51 carries out a renewal operation of a predetermined area of the auxiliary storage 43, for example, in which area programs and a table of parameters to be used by the main processor 41 are stored, e.g., when the renewal packet includes a renewal command and replacement data for the renewal, the communication control processor 51 rewrites the above area using the replacement data, in the step 306.

Then, the communication control processor 5 may carry out the aforementioned reset control operation in the step 305, i.e., sets the predetermined data in the register 53, and thus the output of the register 53 is applied to the main processor 41 to reset the main processor 41.

Accordingly, the main processor 41 carries out the aforementioned resetting operation of FIG. 8 after the content stored in a predetermined area of the auxiliary storage 43.

Among the operations of FIG. 9, the resetting operation following the renewal operation is optional. When only the renewal operation is necessary, the resetting operation following the renewal operation may be eliminated.

As explained above, according to the present invention, no additional transmission line nor additional control station is necessary. Therefore, the additional cost for incorporating the system according to the present invention into an existing communication system is very small.

Further, the remote control in the present invention eliminates a labor cost for a stand-by operator, and reduces the recovery time when a malfunction occurs in an unmanned station.

We claim:

1. A terminal apparatus, comprising:
   receiving means for receiving data which is inputted thereto;
   data processing means for processing data;
   detecting means for detecting predetermined information, which is included in said data, where the information requests that said data processing means be reset;
   data transferring means for transferring said data received by said receiving means to said data processing means when said predetermined information is not detected; and
   reset means for resetting said data processing means when said predetermined information is detected.

2. A terminal apparatus, comprising:
data storage means for storing data;
data processing means for processing data using data stored in said data storage means;
receiving means for receiving data which is inputted thereto;
first detecting means for detecting a reset command in said data in said receiving means;
reset means for resetting said data processing means when said reset command is detected;
second detecting means for detecting a command requesting renewal of data stored in said data storage means, in said data in said receiving means;
data renewing means for renewing data stored in said data storage means when said renewal command is detected; and
data transforming means for transferring data included in said data in said receiving means to said data processing means when neither said reset command nor said renewal command is detected.

3. A terminal apparatus, according to claim 2, wherein
said reset means further resets said data processing means when said renewing is completed.

4. A terminal apparatus, comprising:
data storage for storing data;
a data processing circuit for processing data using data stored in said data storage; and
a data transmit/receive for communicating with a communication apparatus other than said terminal apparatus, said data transmit/receive circuit comprising:
reset command detecting means for detecting a reset command in data received from said communication apparatus; and
reset control means for resetting said data processing circuit when said reset command is detected.

5. A terminal apparatus, according to claim 4, wherein
said data transmit/receive circuit has a communication control processor, and
said reset command detecting means and said reset control means are each realized by a program routine provided for said communication control processor.

6. A terminal apparatus, comprising:
data storage for storing data;
a data processing circuit for processing data using data stored in said data storage; and
a data transmit/receive circuit for communicating with a communication apparatus other than said terminal apparatus, said data transmit/receive circuit comprising:
reset command detecting means for detecting a reset command in data received from said communication apparatus;
reset control means for resetting said data processing circuit when said reset command is detected;
data renewing command detecting means for detecting a renewal command requesting renewal of data in said data storage, in data received from said communication apparatus; and
data renewing means for renewing data in said data storage in accordance with said renewal command.

7. A terminal apparatus, according to claim 6, wherein
said reset control means further resets said data processing circuit when said renewing is completed.

8. A terminal apparatus, according to claim 6, wherein
said data transmit/receive means has a communication control processor, and
said reset command detecting means, said reset control means, said renewing command detecting means, and said data renewing means, are each realized by a program routine provided for said communication control processor.

9. A terminal apparatus, comprising:
a main processor including means for resetting said main processor when an active reset signal is applied thereto;
a line control circuit for receiving data from a transmission line;
a reset signal register for applying said active reset signal to said main processor when said active reset signal is set thereto; and
a communication control processor comprising:
detecting means for detecting predetermined information in said data received by said line control circuit; and
setting means for setting said active reset signal in said reset signal register when said predetermined information is detected by said detecting means.

10. A terminal apparatus according to claim 9, wherein said received data is contained in a fixed frame format containing a header portion therein,
wherein said predetermined information is included in said header portion, and
wherein said detecting means searches for said predetermined information in said header portion when said data is received.

* * * * *